US012769819B2

(12) United States Patent
Bommisetty et al.

(10) Patent No.: US 12,769,819 B2
(45) Date of Patent: Oct. 20, 2026

(54) METHOD, APPARATUS AND COMPUTER PROGRAM

(71) Applicant: Nokia Technologies Oy, Espoo (FI)

(72) Inventors: Sireesha Bommisetty, Bangalore (IN); Topuri Brahmaiah, Bangalore (IN); Mallikarjunudu Makham, Bangalore (IN); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 105 days.

(21) Appl. No.: 18/745,432

(22) Filed: Jun. 17, 2024

(65) Prior Publication Data

US 2025/0028813 A1 Jan. 23, 2025

(30) Foreign Application Priority Data

Jul. 20, 2023 (IN) ............................ 202331104026

(51) Int. Cl.
*G06F 21/44* (2013.01)
*H04L 9/40* (2022.01)

(52) U.S. Cl.
CPC ............ *G06F 21/44* (2013.01); *H04L 63/102* (2013.01); *H04L 63/20* (2013.01)

(58) Field of Classification Search
CPC ........ G06F 21/44; H04L 63/102; H04L 63/20
USPC ............................................................ 726/7
See application file for complete search history.

(56) References Cited

U.S. PATENT DOCUMENTS 10,270,770 B1 * 4/2019 Irwan .................. H04L 63/0876
10,833,938 B1 * 11/2020 Rajput .................... H04L 67/30
10,967,837 B1 * 4/2021 Schulz ................ B60R 25/1001
2011/0167272 A1 * 7/2011 Kolesnikov ........... H04L 9/3271 713/171
2016/0286600 A1 * 9/2016 Faccin .................. H04W 76/27
2020/0401699 A1 * 12/2020 Riehl ...................... G06F 21/32
2021/0295077 A1 * 9/2021 Ross ...................... G06V 40/50
2022/0060388 A1 * 2/2022 Li ....................... H04L 41/0816
2023/0108626 A1 * 4/2023 Schneider ............ H04L 9/0825 713/168

FOREIGN PATENT DOCUMENTS

WO WO-2019222995 A1 * 11/2019 ........... H04W 24/02

OTHER PUBLICATIONS

"3rd Generation Partnership Project; Technical Specification Group TSG SA; Feasibility Study on Localized Mobile Metaverse Services (Release 19)", 3GPP TR 22.856, V2.0.0, Jun. 2023, pp. 1-96.

(Continued)

*Primary Examiner* — Anthony D Brown
(74) *Attorney, Agent, or Firm* — Lippes Mathias LLP

(57) ABSTRACT

A technique comprising: based on a request for a network function instance of a core domain of a mobile communication system to authenticate a digital asset, and based on a configuration of the network function instance, initiating by the network function instance an authentication process to authenticate the digital asset; and responding by the network function instance to the request based on a result of the authentication process.

20 Claims, 4 Drawing Sheets

(56) References Cited

OTHER PUBLICATIONS

"Information technology—Open Systems Interconnection—The Directory: Public-key and attribute certificate frameworks", Series X: Data Networks, Open System Communications and Security—Directory, ITU-T Recommendation X.509, Oct. 2019, 236 pages.
"3rd Generation Partnership Project; Technical Specification Group Services and System Aspects; Security architecture and procedures for 5G system (Release 18)", 3GPP TS 33.501, V18.5.0, Mar. 2024, pp. 1-330.
"3rd Generation Partnership Project, Technical Specification Group Services and System Aspects, Study on security aspects of 5G Mobile Metaverse services; (Release 19)", 3GPP TR 33.721, V0.2.0, May 2024, pp. 1-12.

* cited by examiner

METHOD, APPARATUS AND COMPUTER PROGRAM

FIELD

The present application relates to a method, apparatus, and computer program and in particular but not exclusively to a method, apparatus, and computer program for digital asset authentication in a mobile communication system.

BACKGROUND

Digital assets of a user may comprise digital representations of e.g. user information and/or user documents such as e.g. passport, social security number, avatar, driving license, insurance policy etc. These digital assets may be stored in a digital asset container (DAC) for the user by one or more instances of a network function of a core domain of a mobile communication system (hereafter referred to as digital asset container network function (DAC-NF)).

SUMMARY

A method comprising: based on a request for a network function instance of a core domain of a mobile communication system to authenticate a digital asset, and based on a configuration of the network function instance, initiating by the network function instance an authentication process to authenticate the digital asset; and responding by the network function instance to the request based on a result of the authentication process.

The authentication process may comprise: invoking one or more application programming interfaces that the network function instance is configured to use for digital asset authentication.

The authentication process may comprise: invoking one or more application programming interfaces that the network function is configured to use for acquiring one or more application programming interfaces for digital asset authentication.

The one or more application programming interfaces for digital asset authentication may comprise one or more of: one or more application programming interfaces for interaction with one or more document issuing authorities; or one or more application programming interfaces for interaction with one or more digital certificate authorities.

The request may include a digital image, and the authentication process may comprise creating a digital representation of at least part of the image, and comparing the digital representation against an authentication reference.

The method may comprise receiving a message sent by a management function instance of an operations, administration and maintenance system for the mobile communication system, wherein the message configures the network function instance to create one or more resources for one or more user profiles for one or more users, wherein the user profiles indicate one or more types of digital asset for which the network function instance is to provide a digital asset authentication service.

The method may comprise receiving a message sent by a management function instance of an operations, administration and maintenance system for the mobile communication system, wherein the message configures the network function instance for one or more digital asset authentication processes for the digital asset authentication service.

The method may comprise: sending by the network function instance a request for a network repository function instance to create one or more resources profiling services provided by the network function instance; wherein the one or more resources indicate one or more types of digital asset for which the network function instance provides a digital asset authentication service, and one or more digital asset authentication processes used by the network function instance for the digital asset authentication service.

The request to authenticate a digital asset may include the digital asset; and the method may comprise storing, by the network function instance, the digital asset and an authentication status for the digital asset based on a result of the authentication process to authenticate the digital asset.

A method, comprising: receiving, by an application function instance configured to consume one or more services of one or more network functions of a core domain of a mobile communication system, a request from a user equipment regarding authentication of a digital asset; determining a network function instance of the core domain of the mobile communication system exposing a service relating to authentication of the digital asset; sending by the application function instance a request for the determined network function instance of the mobile communication system to provide the service; and sending by the application function instance a message to the user equipment based on a response to the request for the determined network function instance to provide the service.

The determining may comprise: sending a request for a network repository function of the core domain of the mobile communication system to provide the application function instance with information about one or more network function instances of the core domain exposing the service for the digital asset.

The method may comprise formulating the request for the determined network function instance of the mobile communication system to provide the service, based on information provided by the network repository function instance regarding one or more authentication processes used by the determined network function instance.

The service may comprise authenticating the digital asset.

The service may comprise providing an indication of the authentication status recorded by the network function instance for the digital asset.

The request by the application function instance to provide the service may be sent via a network exposure function of the core domain of the mobile communication system.

A method, comprising: creating, by a network repository function instance, resources profiling services provided by network function instances of a core domain of a mobile communication system; receiving by the network repository function instance a request by an application function instance to provide information regarding one or more network function instances of the core domain exposing one or more digital asset authentication services; and sending by the network repository function instance a response to the request based on the resources.

The resources created by the network repository function instance may indicate one or more digital asset authentication processes used by the one or more network function instances exposing the one or more digital asset authentication services; and the response for the application function instance may indicate the one or more digital asset authentication processes.

Creating the resources may be based on one or more requests by the one or more network function instances of the core domain exposing the one or more digital asset authentication services.

A method comprising: sending, by a management function instance of an operations, administration and maintenance system for a mobile communication system, a message configuring a network function instance of a core domain of the mobile communication system to create one or more resources for one or more user profiles for one or more users, wherein the user profiles indicate one or more types of digital asset for which the network function instance is to provide a digital asset authentication service.

The method may further comprise: sending by the management function instance a message configuring the network function instance for one or more digital asset authentication processes for the digital asset authentication service.

Configuring the network function instance for one or more digital asset authentication processes may comprise one or more of: specifying one or more application programming interfaces for the network function instance to use for digital asset authentication; or specifying one or more application programming interfaces for the network function instance to use for acquiring one or more application programming interfaces for digital asset authentication.

The one or more application programming interfaces for digital asset authentication may comprise one or more of: one or more application programming interfaces for interaction with one or more document issuing authorities; or one or more application programming interfaces for interaction with one or more certificate authorities.

A method comprising: sending from a user equipment via a mobile radio access network of a mobile communication system a request for an application function instance configured to consume one or more services of one or more network function instances of a core domain of the mobile communication system, wherein the request relates to authentication of a digital asset; and receiving at the user equipment authentication status information for the digital asset in response to the request.

Apparatus comprising means for: based on a request for a network function instance of a core domain of a mobile communication system to authenticate a digital asset, and based on a configuration of the network function instance, initiating by the network function instance an authentication process to authenticate the digital asset; and responding by the network function instance to the request based on a result of the authentication process.

The authentication process may comprise: invoking one or more application programming interfaces that the network function instance is configured to use for digital asset authentication.

The authentication process may comprise: invoking one or more application programming interfaces that the network function is configured to use for acquiring one or more application programming interfaces for digital asset authentication.

The one or more application programming interfaces for digital asset authentication may comprise one or more of: one or more application programming interfaces for interaction with one or more document issuing authorities; or one or more application programming interfaces for interaction with one or more digital certificate authorities.

The request may include a digital image, and the authentication process may comprise creating a digital representation of at least part of the image, and comparing the digital representation against an authentication reference.

The apparatus may comprise means for receiving a message sent by a management function instance of an operations, administration and maintenance system for the mobile communication system, wherein the message configures the network function instance to create one or more resources for one or more user profiles for one or more users, wherein the user profiles indicate one or more types of digital asset for which the network function instance is to provide a digital asset authentication service.

The apparatus may comprise means for receiving a message sent by a management function instance of an operations, administration and maintenance system for the mobile communication system, wherein the message configures the network function instance for one or more digital asset authentication processes for the digital asset authentication service.

The apparatus may comprise means for sending by the network function instance a request for a network repository function instance to create one or more resources profiling services provided by the network function instance; wherein the one or more resources indicate one or more types of digital asset for which the network function instance provides a digital asset authentication service, and one or more digital asset authentication processes used by the network function instance for the digital asset authentication service.

The request to authenticate a digital asset may include the digital asset; and the apparatus may comprise means for storing, by the network function instance, the digital asset and an authentication status for the digital asset based on a result of the authentication process to authenticate the digital asset.

Apparatus, comprising means for: receiving, by an application function instance configured to consume one or more services of one or more network functions of a core domain of a mobile communication system, a request from a user equipment regarding authentication of a digital asset; determining a network function instance of the core domain of the mobile communication system exposing a service relating to authentication of the digital asset; sending by the application function instance a request for the determined network function instance of the mobile communication system to provide the service; and sending by the application function instance a message to the user equipment based on a response to the request for the determined network function instance to provide the service.

The determining may comprise sending a request for a network repository function of the core domain of the mobile communication system to provide the application function instance with information about one or more network function instances of the core domain exposing the service for the digital asset.

The apparatus may comprise means for formulating the request for the determined network function instance of the mobile communication system to provide the service, based on information provided by the network repository function instance regarding one or more authentication processes used by the determined network function instance.

The service may comprise authenticating the digital asset.

The service may comprise providing an indication of the authentication status recorded by the network function instance for the digital asset.

The request by the application function instance to provide the service may be sent via a network exposure function of the core domain of the mobile communication system.

Apparatus, comprising means for: creating, by a network repository function instance, resources profiling services provided by network function instances of a core domain of a mobile communication system; receiving by the network repository function instance a request by an application function instance to provide information regarding one or more network function instances of the core domain exposing one or more digital asset authentication services; and sending by the network repository function instance a response to the request based on the resources.

The resources created by the network repository function instance may indicate one or more digital asset authentication processes used by the one or more network function instances exposing the one or more digital asset authentication services; and the response for the application function instance may indicate the one or more digital asset authentication processes.

Creating the resources may be based on one or more requests by the one or more network function instances of the core domain exposing the one or more digital asset authentication services.

Apparatus comprising means for: sending, by a management function instance of an operations, administration and maintenance system for a mobile communication system, a message configuring a network function instance of a core domain of the mobile communication system to create one or more resources for one or more user profiles for one or more users, wherein the user profiles indicate one or more types of digital asset for which the network function instance is to provide a digital asset authentication service.

The apparatus may further comprise means for sending by the management function instance a message configuring the network function instance for one or more digital asset authentication processes for the digital asset authentication service.

Configuring the network function instance for one or more digital asset authentication processes may comprise one or more of: specifying one or more application programming interfaces for the network function instance to use for digital asset authentication; or specifying one or more application programming interfaces for the network function instance to use for acquiring one or more application programming interfaces for digital asset authentication.

The one or more application programming interfaces for digital asset authentication may comprise one or more of: one or more application programming interfaces for interaction with one or more document issuing authorities; or one or more application programming interfaces for interaction with one or more certificate authorities.

Apparatus comprising means for: sending via a mobile radio access network of a mobile communication system a request for an application function instance configured to consume one or more services of one or more network function instances of a core domain of the mobile communication system, wherein the request relates to authentication of a digital asset; and receiving authentication status information for the digital asset in response to the request.

Apparatus comprising: at least one processor; and at least one memory including computer program code, the at least one memory and computer program code configured to, with the at least one processor, cause the apparatus to perform: based on a request for a network function instance of a core domain of a mobile communication system to authenticate a digital asset, and based on a configuration of the network function instance, initiating by the network function instance an authentication process to authenticate the digital asset; and responding by the network function instance to the request based on a result of the authentication process.

The authentication process may comprise invoking one or more application programming interfaces that the network function instance is configured to use for digital asset authentication.

The authentication process may comprise invoking one or more application programming interfaces that the network function is configured to use for acquiring one or more application programming interfaces for digital asset authentication.

The one or more application programming interfaces for digital asset authentication may comprise one or more of: one or more application programming interfaces for interaction with one or more document issuing authorities; or one or more application programming interfaces for interaction with one or more digital certificate authorities.

The request may include a digital image, and the authentication process may comprise creating a digital representation of at least part of the image, and comparing the digital representation against an authentication reference.

The at least one memory and computer program code may be configured to, with the at least one processor, cause the apparatus to: receive a message sent by a management function instance of an operations, administration and maintenance system for the mobile communication system, wherein the message configures the network function instance to create one or more resources for one or more user profiles for one or more users, wherein the user profiles indicate one or more types of digital asset for which the network function instance is to provide a digital asset authentication service.

The at least one memory and computer program code may be configured to, with the at least one processor, cause the apparatus to: receive a message sent by a management function instance of an operations, administration and maintenance system for the mobile communication system, wherein the message configures the network function instance for one or more digital asset authentication processes for the digital asset authentication service.

The at least one memory and computer program code may be configured to, with the at least one processor, cause the apparatus to: send by the network function instance a request for a network repository function instance to create one or more resources profiling services provided by the network function instance; wherein the one or more resources indicate one or more types of digital asset for which the network function instance provides a digital asset authentication service, and one or more digital asset authentication processes used by the network function instance for the digital asset authentication service.

The request to authenticate a digital asset may include the digital asset; and the at least one memory and computer program code may be configured to, with the at least one processor, cause the apparatus to: store, by the network function instance, the digital asset and an authentication status for the digital asset based on a result of the authentication process to authenticate the digital asset.

Apparatus comprising: at least one processor; and at least one memory including computer program code, the at least one memory and computer program code configured to, with the at least one processor, cause the apparatus to perform: receiving, by an application function instance configured to consume one or more services of one or more network functions of a core domain of a mobile communication system, a request from a user equipment regarding authentication of a digital asset; determining a network function instance of the core domain of the mobile communication system exposing a service relating to authentication of the digital asset; sending by the application function instance a request for the determined network function instance of the mobile communication system to provide the service; and sending by the application function instance a message to the user equipment based on a response to the request for the determined network function instance to provide the service.

The determining may comprise sending a request for a network repository function of the core domain of the mobile communication system to provide the application function instance with information about one or more network function instances of the core domain exposing the service for the digital asset.

The at least one memory and computer program code may be configured to, with the at least one processor, cause the apparatus to: formulate the request for the determined network function instance of the mobile communication system to provide the service, based on information provided by the network repository function instance regarding one or more authentication processes used by the determined network function instance.

The service may comprise authenticating the digital asset.

The service may comprise providing an indication of the authentication status recorded by the network function instance for the digital asset.

The request by the application function instance to provide the service may be sent via a network exposure function of the core domain of the mobile communication system.

Apparatus comprising: at least one processor; and at least one memory including computer program code, the at least one memory and computer program code configured to, with the at least one processor, cause the apparatus to perform: creating, by a network repository function instance, resources profiling services provided by network function instances of a core domain of a mobile communication system; receiving by the network repository function instance a request by an application function instance to provide information regarding one or more network function instances of the core domain exposing one or more digital asset authentication services; and sending by the network repository function instance a response to the request based on the resources.

The resources created by the network repository function instance may indicate one or more digital asset authentication processes used by the one or more network function instances exposing the one or more digital asset authentication services; and the response for the application function instance may indicate the one or more digital asset authentication processes.

Creating the resources may be based on one or more requests by the one or more network function instances of the core domain exposing the one or more digital asset authentication services.

Apparatus comprising: at least one processor; and at least one memory including computer program code, the at least one memory and computer program code configured to, with the at least one processor, cause the apparatus to perform: sending, by a management function instance of an operations, administration and maintenance system for a mobile communication system, a message configuring a network function instance of a core domain of the mobile communication system to create one or more resources for one or more user profiles for one or more users, wherein the user profiles indicate one or more types of digital asset for which the network function instance is to provide a digital asset authentication service.

The at least one memory and computer program code may be configured to, with the at least one processor, cause the apparatus to: send by the management function instance a message configuring the network function instance for one or more digital asset authentication processes for the digital asset authentication service.

Configuring the network function instance for one or more digital asset authentication processes may comprise one or more of: specifying one or more application programming interfaces for the network function instance to use for digital asset authentication; or specifying one or more application programming interfaces for the network function instance to use for acquiring one or more application programming interfaces for digital asset authentication.

The one or more application programming interfaces for digital asset authentication may comprise one or more of: one or more application programming interfaces for interaction with one or more document issuing authorities; or one or more application programming interfaces for interaction with one or more certificate authorities.

Apparatus comprising: at least one processor; and at least one memory including computer program code, the at least one memory and computer program code configured to, with the at least one processor, cause the apparatus to perform: sending via a mobile radio access network of a mobile communication system a request for an application function instance configured to consume one or more services of one or more network function instances of a core domain of the mobile communication system, wherein the request relates to authentication of a digital asset; and receiving authentication status information for the digital asset in response to the request.

Apparatus comprising: initiating circuitry for, based on a request for a network function instance of a core domain of a mobile communication system to authenticate a digital asset, and based on a configuration of the network function instance, initiating by the network function instance an authentication process to authenticate the digital asset; and responding circuitry for responding by the network function instance to the request based on a result of the authentication process.

Apparatus, comprising: receiving circuitry for receiving, by an application function instance configured to consume one or more services of one or more network functions of a core domain of a mobile communication system, a request from a user equipment regarding authentication of a digital asset; determining circuitry for determining a network function instance of the core domain of the mobile communication system exposing a service relating to authentication of the digital asset; sending circuitry for sending by the application function instance a request for the determined network function instance of the mobile communication system to provide the service; and sending circuitry for sending by the application function instance a message to the user equipment based on a response to the request for the determined network function instance to provide the service.

Apparatus, comprising: creating circuitry for creating, by a network repository function instance, resources profiling services provided by network function instances of a core domain of a mobile communication system; receiving circuitry for receiving by the network repository function instance a request by an application function instance to provide information regarding one or more network function instances of the core domain exposing one or more digital asset authentication services; and sending circuitry for sending by the network repository function instance a response to the request based on the resources.

Apparatus comprising: sending circuitry for sending, by a management function instance of an operations, administration and maintenance system for a mobile communication system, a message configuring a network function instance of a core domain of the mobile communication system to create one or more resources for one or more user profiles for one or more users, wherein the user profiles indicate one or more types of digital asset for which the network function instance is to provide a digital asset authentication service.

Apparatus comprising: sending circuitry for sending via a mobile radio access network of a mobile communication system a request for an application function instance configured to consume one or more services of one or more network function instances of a core domain of the mobile communication system, wherein the request relates to authentication of a digital asset; and receiving circuitry for receiving authentication status information for the digital asset in response to the request.

A computer readable medium comprising program instructions stored thereon for performing:

based on a request for a network function instance of a core domain of a mobile communication system to authenticate a digital asset, and based on a configuration of the network function instance, initiating by the network function instance an authentication process to authenticate the digital asset; and responding by the network function instance to the request based on a result of the authentication process.

A computer readable medium comprising program instructions stored thereon for performing:

receiving, by an application function instance configured to consume one or more services of one or more network functions of a core domain of a mobile communication system, a request from a user equipment regarding authentication of a digital asset; determining a network function instance of the core domain of the mobile communication system exposing a service relating to authentication of the digital asset; sending by the application function instance a request for the determined network function instance of the mobile communication system to provide the service; and sending by the application function instance a message to the user equipment based on a response to the request for the determined network function instance to provide the service.

A computer readable medium comprising program instructions stored thereon for performing:

creating, by a network repository function instance, resources profiling services provided by network function instances of a core domain of a mobile communication system; receiving by the network repository function instance a request by an application function instance to provide information regarding one or more network function instances of the core domain exposing one or more digital asset authentication services; and sending by the network repository function instance a response to the request based on the resources.

A computer readable medium comprising program instructions stored thereon for performing:

sending, by a management function instance of an operations, administration and maintenance system for a mobile communication system, a message configuring a network function instance of a core domain of the mobile communication system to create one or more resources for one or more user profiles for one or more users, wherein the user profiles indicate one or more types of digital asset for which the network function instance is to provide a digital asset authentication service.

A computer readable medium comprising program instructions stored thereon for performing:

sending from a user equipment via a mobile radio access network of a mobile communication system a request for an application function instance configured to consume one or more services of one or more network function instances of a core domain of the mobile communication system, wherein the request relates to authentication of a digital asset; and receiving at the user equipment authentication status information for the digital asset in response to the request.

A non-transitory computer readable medium comprising program instructions stored thereon for performing: based on a request for a network function instance of a core domain of a mobile communication system to authenticate a digital asset, and based on a configuration of the network function instance, initiating by the network function instance an authentication process to authenticate the digital asset; and responding by the network function instance to the request based on a result of the authentication process.

A non-transitory computer readable medium comprising program instructions stored thereon for performing: receiving, by an application function instance configured to consume one or more services of one or more network functions of a core domain of a mobile communication system, a request from a user equipment regarding authentication of a digital asset; determining a network function instance of the core domain of the mobile communication system exposing a service relating to authentication of the digital asset; sending by the application function instance a request for the determined network function instance of the mobile communication system to provide the service; and sending by the application function instance a message to the user equipment based on a response to the request for the determined network function instance to provide the service.

A non-transitory computer readable medium comprising program instructions stored thereon for performing: creating, by a network repository function instance, resources profiling services provided by network function instances of a core domain of a mobile communication system;

receiving by the network repository function instance a request by an application function instance to provide information regarding one or more network function instances of the core domain exposing one or more digital asset authentication services; and sending by the network repository function instance a response to the request based on the resources.

A non-transitory computer readable medium comprising program instructions stored thereon for performing: sending, by a management function instance of an operations, administration and maintenance system for a mobile communication system, a message configuring a network function instance of a core domain of the mobile communication system to create one or more resources for one or more user profiles for one or more users, wherein the user profiles indicate one or more types of digital asset for which the network function instance is to provide a digital asset authentication service.

A non-transitory computer readable medium comprising program instructions stored thereon for performing: sending from a user equipment via a mobile radio access network of a mobile communication system a request for an application function instance configured to consume one or more services of one or more network function instances of a core domain of the mobile communication system, wherein the request relates to authentication of a digital asset; and receiving at the user equipment authentication status information for the digital asset in response to the request.

A computer program comprising computer executable code which when run on at least one processor is configured to cause an apparatus at least to: based on a request for a network function instance of a core domain of a mobile communication system to authenticate a digital asset, and based on a configuration of the network function instance, initiate by the network function instance an authentication process to authenticate the digital asset; and respond by the network function instance to the request based on a result of the authentication process.

A computer program comprising computer executable code which when run on at least one processor is configured to cause an apparatus at least to: receive, by an application function instance configured to consume one or more services of one or more network functions of a core domain of a mobile communication system, a request from a user equipment regarding authentication of a digital asset; determine a network function instance of the core domain of the mobile communication system exposing a service relating to authentication of the digital asset; send by the application function instance a request for the determined network function instance of the mobile communication system to provide the service; and send by the application function instance a message to the user equipment based on a response to the request for the determined network function instance to provide the service.

A computer program comprising computer executable code which when run on at least one processor is configured to cause an apparatus at least to: create, by a network repository function instance, resources profiling services provided by network function instances of a core domain of a mobile communication system; receive by the network repository function instance a request by an application function instance to provide information regarding one or more network function instances of the core domain exposing one or more digital asset authentication services; and send by the network repository function instance a response to the request based on the resources.

A computer program comprising computer executable code which when run on at least one processor is configured to cause an apparatus at least to: send, by a management function instance of an operations, administration and maintenance system for a mobile communication system, a message configuring a network function instance of a core domain of the mobile communication system to create one or more resources for one or more user profiles for one or more users, wherein the user profiles indicate one or more types of digital asset for which the network function instance is to provide a digital asset authentication service.

A computer program comprising computer executable code which when run on at least one processor is configured to cause a user equipment at least to: send via a mobile radio access network of a mobile communication system a request for an application function instance configured to consume one or more services of one or more network function instances of a core domain of the mobile communication system, wherein the request relates to authentication of a digital asset; and receive authentication status information for the digital asset in response to the request.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Figure 1:
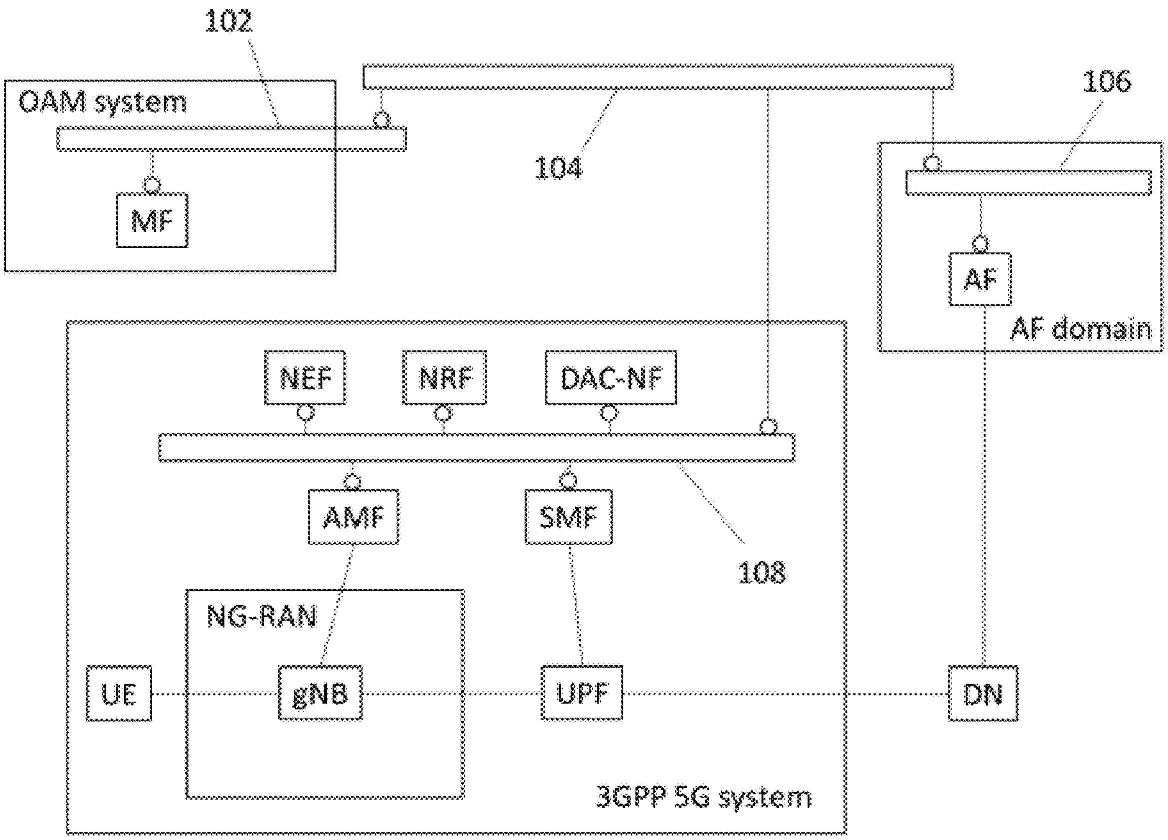
FIG. 1 shows a representation of a system according to some example embodiments.

FIG. 1 shows a schematic representation of some elements of a 3GPP 5G mobile communication system (5GS). The 5GS comprises a 5G radio access network (5GRAN) or next generation radio access network (NG-RAN) for achieving radio access between a terminal or user equipment (UE) and a 5G core network (5GC) of the 5GS. The 5GC adopts an open and modular service platform: the Service-Based Architecture (SBA). SBA provides a cloud-native service framework in which mobile core network functionalities (authentication, mobility management, etc.) are supported by instances of network functions (NFs), self-contained software applications that can be run on hardware hosted by cloud infrastructure. Services exposed by one NF instance (service producer) to another NF instance (service consumer) are described using application programming interface (API) specifications that identify the set of accessible service data and indicate the authorized operations on these service data. The NF instances of the core domain are interconnected on a logically shared infrastructure comprising a CN domain message bus 108. NF instances offer, via the CN domain message bus 108, services accessible to any other authorized NF instances through APIs (Application Programming Interfaces) referred to as service-based interfaces (SBI). One of the network functions comprises a network repository function (NRF), which is accessible to all network function instances to discover services available in the core domain and retrieve information for interacting with network function instances supporting the services.

The services exposed by the network functions of the core domain may also be made open to application functions (AF) of an AF domain via a network exposure function (NEF) of the core domain, through the CN domain message bus 108, an inter-domain message bus 104 and an AF domain message bus 106. The NEF exposes secured APIs to AFs. Management of the 5GS is achieved through management functions (MF) of an operations, administration and maintenance (OAM) system. A MF instance of the OAM system may configure one or more NF instances via a OAM-domain message bus 102, the inter-domain message bus 104, and the CN domain message bus 108.

The core domain of the 5GS comprises one or more instances of other network functions not shown in FIG. 1, such as e.g. Network Slice Selection Function (NSSF); Policy Control Function (PCF); Unified Data Management (UDM); and Authentication Server Function (AUSF); in addition to one or more instances of the network functions illustrated in FIG. 1 including those already described above and one or more instances of Access and Mobility Management Function (AMF) and Session Management Function (SMF).

The 5G-RAN may comprise one or more gNodeB (GNB) or one or more gNodeB (GNB) distributed unit functions connected to one or more gNodeB (GNB) centralized unit functions. The gNB is part of the user plane providing access between UE and one or more data networks (DN) via one or more user plane function (UPF) instances.

Figure 2:
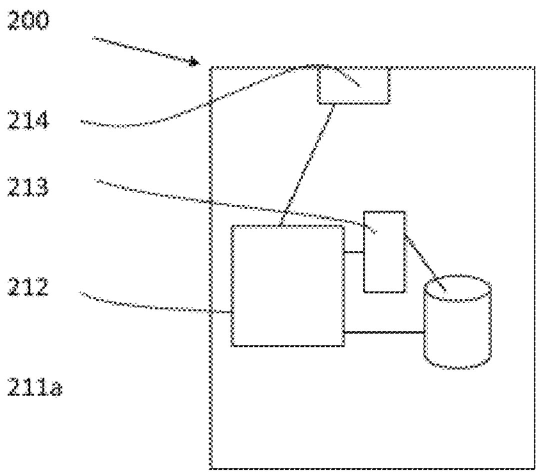
FIG. 2 shows a representation of a control apparatus according to some example embodiments.

FIG. 2 illustrates an example of a control apparatus 200 for running one or more functions illustrated in FIG. 1. The functions illustrated in FIG. 1 may be run on respective control apparatus, or may share a control apparatus with one or more other functions. The control apparatus may comprise at least one random access memory (RAM) 211*a*, at least one read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*.

Figure 3:
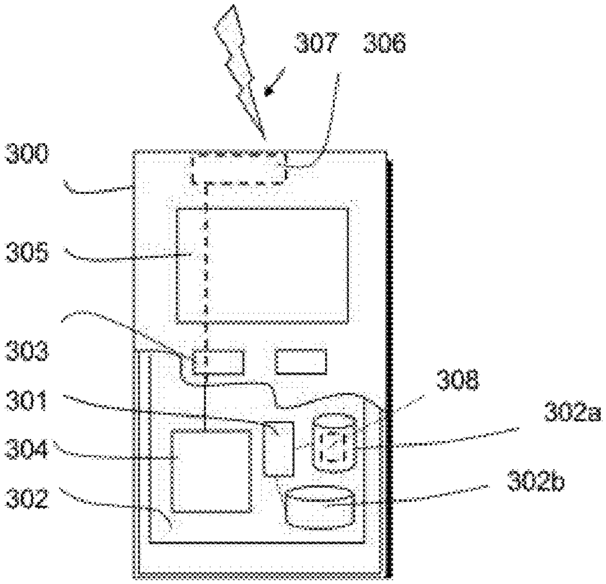
FIG. 3 shows a representation of an apparatus according to some example embodiments.

FIG. 3 illustrates an example of a terminal 300, such as the terminal illustrated in FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

Figure 4:
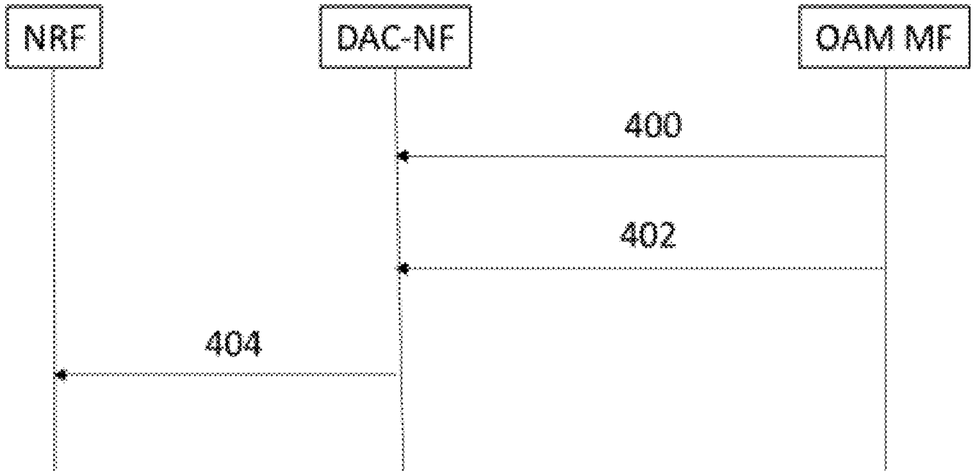
FIG. 4 shows a representation of operations by instances of OAM-MF, DAC-NF and NRF according to some example embodiments.

FIG. 4 shows a representation of operations at instances of OAM MF, DAC-NF and NRF according to some example embodiments.

OPERATION 400: OAM MF instance sends a message for a DAC-NF instance of the core domain of the 5GS configuring the DAC-NF instance to create a user profile resource for a user. The user profile details may be based on customer relationship management (CRM) information.

An example of a user profile is set out below for the example of documents as digital assets.

| ATTRIBUTE | DETAILS |
|---|---|
| Name | Pekka |
| Number of documents allowed | 5 |
| Size of the document allowed | 2 MB |
| Maximum size allocated in DAC NF | 10 MB |
| Authentication Enabled | True |

The user profile indicates limits on the storage of digital assets for the user in the core domain of the 5GS, and whether an authentication service is enabled for the digital assets for the user.

OPERATION 402: The OAM MF instance sends a message for the DAC-NF instance configuring the DAC-NF instance in relation to the provision of a digital asset authentication service by the DAC-NF instance. For the example of documents as digital assets, this configuration of the DAC-NF instance may relate to: (i) the type of document for which the DAC-NF instance is to provide an authentication service; (ii) the issuing authority to be used for the authentication service; (iii) the type of authentication to be used for the authentication service per document type; and (iv) resources to be used for the authentication service. The resources to be used for the authentication service may, for example, comprise (a) one or more APIs for document authentication at one or more issuing authorities; (b) certificate chain information for verifying a digital certificate of a document signor, or one or more APIs for downloading certificate chain information; (c) digital representations of trusted seals, logos, physical signatures, icons, emojis etc. for scanned physical document verification, or configuration of one or more APIs for downloading such digital representations.

One example of a structure for document authentication information for configuring the DAC-NF instance for providing the document authentication service is shown below.

| Attribute | meaning | Values |
|---|---|---|
| Document Type | Document type supported | 1: Passport<br>2: License<br>3: Digital Money<br>4: Insurance<br>5. Form16<br>6: PAN, etc. |
| Issuing Authority | Document Issuing | Passport Authority Of India, |

-continued

| Attribute | meaning | Values |
|---|---|---|
| | Authority | Suomi.fi, Social Security Administration (SSA) |
| Supported Authentication Type | Supported authentication type per document | 1: Passport: Authenticated by Passport Issuing Authority Digital Certificate based authentication<br>2: Driving License: Authenticated by Transport License authority Digital certificate based authentication<br>3: Digital Money: BlockChain based authentication<br>4. Nokia Documents with seal: Scanned physical document verification using seal |
| Procedures for Authentication | Supported procedures for authentication | a. Check with Issuing Authority Configuration of APIs to send document and receive authentication response synchronously/asynchronously.<br>b. Certificate Based Authentication Certificate chain installation for verifying the digital certificate of the document signer.<br>Or<br>API for downloading the certificate chain for verifying the digital certificate of the document signer.<br>c. Scanned Physical Document verification using seal/physical signature/logo/icon/emoji Configuration of trusted seals, logos, physical signatures, icons, emojis etc<br>Or<br>APIs for downloading and verifying the seals, logos physical signatures, icons, emojis etc |

For example: a passport issued by the Passport Authority of India would be classified in this configuration information as a "passport" type document; and the configuration by OAM-MF of the DAC-NF for providing the authentication service may include configuring the DAC-NF instance to use an API provided by the Passport Authority of India for authentication of Indian passport documents. The authentication service provided by the DAC-NF instance may comprise the DAC-NF instance invoking the configured API with information about the passport document to be authenticated. The procedure may comprise a synchronous response from the Indian Passport Authority, or may comprise an asynchronous response based on a subscribe operation by the DAC-NF instance indicating a call back URI to be invoked by the Indian Passport Authority.

OPERATION 404: The DAC-NF instance uses a NFRegister API to configure NRF to create a resource for the NF profile of the DAC-NF instance. The NF profile includes the above-described document authentication information.

Figure 5:
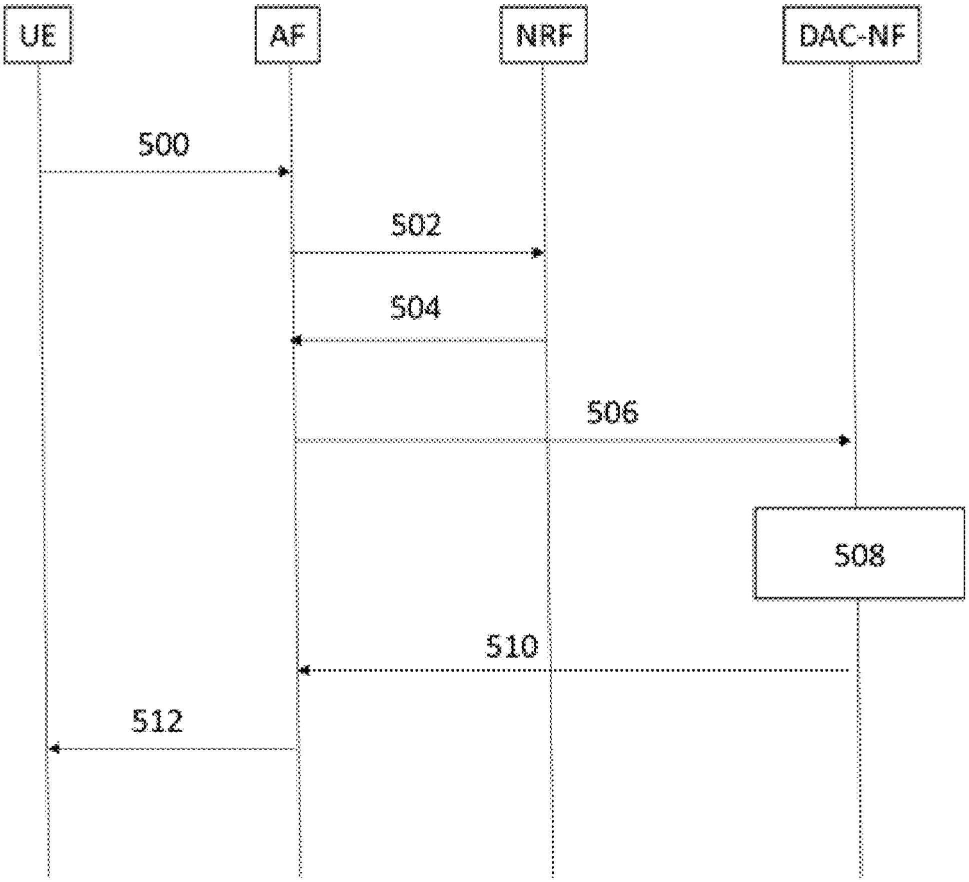
FIG. 5 shows a representation of operations by instances of DAC-NF, NRF, AF and by a UE according to some example embodiments.

FIG. 5 shows a representation of operations by a UE, NRF and the DAC-NF instance configured by the OAM system, for authenticating digital assets for the user associated with the UE, according to some example embodiments.

OPERATION 500: UE sends a message for AF requesting upload of a digital asset (e.g. digital representation of a passport) to 5GS.

OPERATION 502: AF obtains (via NEF) information stored by NRF about the document authentication capabilities of the DAC-NF instance configured by the OAM system for authenticating digital assets for the user associated with the UE. This operation may comprise: (a) AF using a NFDiscovery API to discover the DAC-NF instance configured by the OAM system for providing an authentication service for digital assets for the user associated with the UE; or (b) AF using a HTTP GET operation to fetch document authentication capabilities from the DAC-NF profile registered by the NRF for the DAC-NF instance configured by the OAM system for providing an authentication service for digital assets for the user associated with the UE; or (c) AF using NFStatusSubscribe request to subscribe to changes in status of the DAC-NF instance configured by the OAM system for providing an authentication service for digital assets for the user associated with the UE.

OPERATION 504: NRF produces for AF a response (NFDiscover Response or GET Response or NFStatusNotify) including the NF profile for the DAC-NF instance configured by the OAM system for providing an authentication service for digital assets for the user associated with the UE. The NF profile includes information about the document authentication capabilities of the authentication service provided by the DAC-NF instance.

OPERATION 506: Based on the NF profile for the DAC-NF instance configured by the OAM system for providing an authentication service for digital assets for the user associated with the UE, AF determines that the DAC-NF instance supports document authentication for the type of document identified in the request from UE. Based on this determination, AF prepares a document authentication request for the DAC-NF instance. The request includes the document details indicated by the NF Profile for the DAC-NF instance to be required by the DAC-NF instance for providing the authentication service for the type of document identified in the request from UE.

For example, AF may send (via NEF) a message for the DAC-NF instance having the following format.

| |
|---|
| Document Type= Passport |
| Document Number: N234346 |
| Expiry:10/25 |
| Issued date: 10/15 |
| Issuing Authority: Passport Authority Of India |
| Attachment:<Empty> |
| Authentication required=true |
| Type of authentication: Check with Issuing Authority |

Alternatively, AF may send (via NEF) a message for the DAC-NF instance including a digital image of the document to be authenticated, and DAC-NF instance may extract the required document information from the digital image using document readers/image processing tools.

OPERATION 508: Based on the document details provided by AF (or based on document details extracted from a document image provided by AF), the DAC-NF instance initiates an authentication procedure according to the above-described document authentication information provided by OAM MF (Operation 402 of FIG. 4).

For example, in the event that the document indicated in the request by AF is of a type for which DAC-NF instance has been configured by the OAM-MF to use offline authentication, the DAC-NF instance sends a message for a OAM/Operator function of the 5G system including details of the document to be authenticated, and the OAM/Operator function contacts the issuing authority that issued the document through out of band mechanisms. The OAM/Operator function updates the DAC-NF instance based on information received by the OAM/Operator function, and the DAC-NF instance registers the authentication status (true or false) of the document accordingly.

Figure 6:
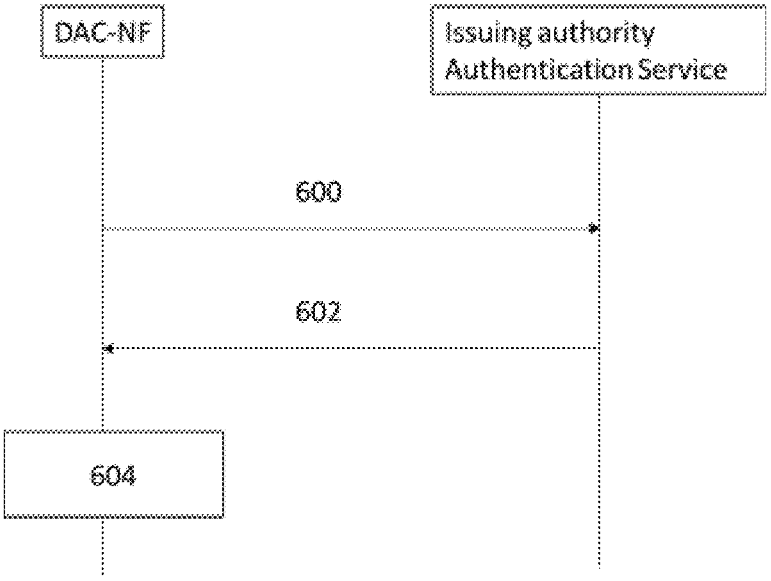
FIG. 6 shows a representation of operations by an instance of DAC-NF according to some example embodiments.

On the other hand, in the event that the document indicated in the request by AF is of a type for which the OAM MF has specified the use of an API for the issuing authority that issued the document, the DAC-NF instance invokes the API specified by the OAM-MF, and waits for an authentication response based on the information provided by the DAC-NF instance to the issuing authority about the document. The response may be a synchronous response or may be an asynchronous response based on a callback URI provided by the DAC-NF instance. With reference to FIG. 6, the DAC-NF instance may send an authenticatePassportInformation request for the authentication service of the issuing authority (OPERATION 600) to authenticate a digital representation of the passport document. The request includes details of the passport document to be authenticated and may include a callback URI for an asynchronous response. Based on the request, the DAC-NF instance receives a response (synchronous or asynchronous) indicating the result of the authentication check at the issuing authority authentication service (OPERATION 602). The DAC-NF instance updates the resource created by the DAC-NF instance for the document, based on the response from the issuing authority (OPERATION 604). For example, in the case of a positive response, the update may be addition of "authenticated=true".

Figure 7:
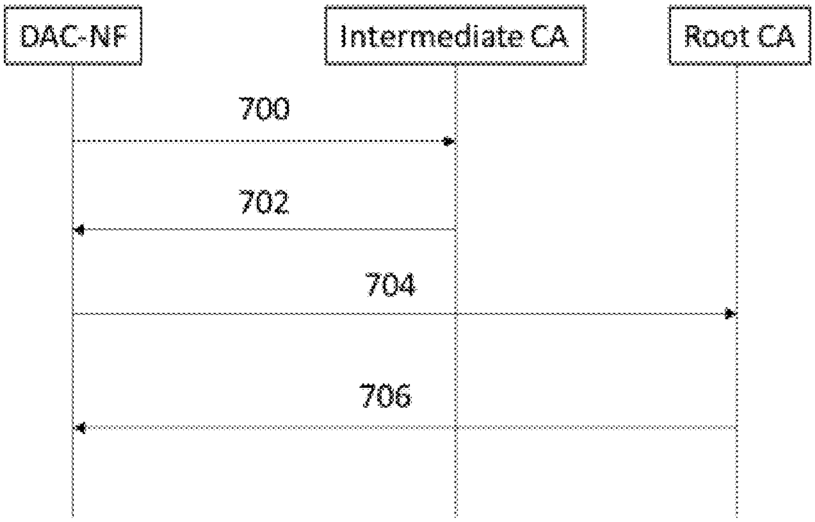
FIG. 7 shows a representation of operations by an instance of DAC-NF according to some example embodiments.

FIG. 7 shows a representation of another example of a process for the authentication service provided by the DAC-NF instance. The DAC-NF instance has been provided by the OAM-MF with information about the certificate chain for a digital asset (e.g. digital representation of an insurance document) and with one or more APIs for the certificate authorities involved in the certificate chain. Alternatively, the DAC-NF has been provided by the OAM-MF with one or more APIs to download information about the certificate chain for the digital asset, and the DAC-NF instance uses the one or more APIs to download one or more APIs for the certificate authorities involved in the certificate chain. The DAC-NF instance uses the APIs (e.g. APIs to obtain public key certificates according to the ITU X.509 standard format) to verify the series of digital certificates of a certificate chain back to the root certificate authority (CA).

The DAC-NF instance sends (OPERATION 700) a request for an intermediate CA to provide information by which the DAC-NF instance can verify the first certificate of the certificate chain; and receives the information in response. Based on this information, the DAC-NF checks the first certificate in the certificate chain. If the check is successful, the DAC-NF instance sends a request for the next CA in the chain (in this example, the root CA) to provide information by which the DAC-NF instance can verify the certificate of the intermediate CA. Based on this information, the DAC-NF checks the certificate of the intermediate CA. The DAC-NF instance updates the resource created by the DAC-NF for the document, based on the result of checking the certificate chain. For example, in the case of a series of positive verifications back to the root CA, the update may be addition of "authenticated=true".

According to another example of an authentication process for the authentication service provided by the DAC-NF instance, the request message by the AF for the DAC-NF instance may comprise an image of the document to be authenticated. The DAC-NF instance has been configured by OAM-MF to use image processing mechanisms to extract information from the image required for providing the authentication service. For example, the DAC-NF instance may create a digital representation of one or more features of the received image such as a seal/logo/emoji/physical signature, and compares the digital representation with one or more digital representations already stored by the DAC-NF, or downloaded by the DAC-NF instance using one or more APIs specified by the OAM-MF.

OPERATION 510 of FIG. 5: The DAC NF instance sends (via NEF) a message for AF indicating the authentication status of the digital asset (document).

OPERATION 512: Based on the information provided by DAC-NF, the AF sends a message to UE indicating the authentication status of the digital asset (document).

The description above relates to AF requesting the DAC-NF instance to authenticate a digital asset received from UE. The DAC-NF instance may also provide a service comprising providing an indication of the authentication status currently recorded by the DAC-NF instance for a digital asset; and before requesting the DAC-NF instance to authenticate a digital asset, AF may first invoke an API for requesting DAC-NF for an indication of the authentication status currently recorded by the DAC-NF instance for the digital asset.

It is noted that whilst some embodiments have been described in relation to 5GS, similar principles can be applied in relation to other mobile communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the FIG.s may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising: at least one processor; and at least one memory including computer program code, the at least one memory and computer program code configured to, with the at least one processor, cause the apparatus to perform:

receiving, from a management function instance of an operations, administration and maintenance system for a mobile communication system, a message configuring a network function instance of a core domain of the mobile communication system with document authentication information, the document authentication information specifying one or more types of user document for which the network function instance is to provide a digital asset authentication service, and one or more authentication procedures corresponding to the one or more types of user document;

based on a request for the network function instance of the core domain of the mobile communication system to authenticate a digital asset comprising a digital representation of a user document, and based on the document authentication information of the network function instance, initiating by the network function instance an authentication process to authenticate the digital asset, wherein the request comprises a digital image of the user document, and the authentication process comprises creating a digital representation of one or more features of at least part of the digital image comprising at least one of a seal, a logo, or a physical signature, and comparing the digital representation of the one or more features against an authentication reference comprising one or more stored or downloaded reference digital representations; and responding by the network function instance to the request based on a result of the authentication process.

2. The apparatus according to claim 1, wherein the authentication process comprises: invoking one or more application programming interfaces that the network function instance is configured to use for digital asset authentication.

3. The apparatus according to claim 2, wherein the one or more application programming interfaces for digital asset authentication comprise one or more of: one or more application programming interfaces for interaction with one or more document issuing authorities; or one or more application programming interfaces for interaction with one or more digital certificate authorities.

4. The apparatus according to claim 1, wherein the at least one memory and computer program code are configured to, with the at least one processor, cause the apparatus to: receive a message sent by a management function instance of an operations, administration and maintenance system for the mobile communication system, wherein the message configures the network function instance to create one or more resources for one or more user profiles for one or more users, wherein the user profiles indicate one or more types of digital asset for which the network function instance is to provide a digital asset authentication service.

5. The apparatus according to claim 1, wherein the at least one memory and computer program code are configured to, with the at least one processor, cause the apparatus to: send by the network function instance a request for a network repository function instance to create one or more resources profiling services provided by the network function instance; wherein the one or more resources indicate one or more types of digital asset for which the network function instance provides a digital asset authentication service, and one or more digital asset authentication processes used by the network function instance for the digital asset authentication service.

6. The apparatus according to claim 1, wherein the request to authenticate a digital asset includes the digital asset; and wherein the at least one memory and computer program code are configured to, with the at least one processor, cause the apparatus to: store, by the network function instance, the digital asset and an authentication status for the digital asset based on a result of the authentication process to authenticate the digital asset.

7. An apparatus comprising: at least one processor; and at least one memory including computer program code, the at least one memory and computer program code configured to, with the at least one processor, cause the apparatus to perform:

receiving, by an application function instance configured to consume one or more services of one or more network functions of a core domain of a mobile communication system, a request from a user equipment regarding authentication of a digital asset comprising a digital representation of a user document, wherein the request comprises a digital image of the user document, and the authentication comprises creating a digital representation of at least part of the digital image of the user document, and comparing the digital representation of at least part of the digital image of the user document against an authentication reference;

determining a network function instance of the core domain of the mobile communication system exposing a service relating to authentication of the digital asset by sending a request for a network repository function of the core domain of the mobile communication system to provide the application function instance with information about one or more network function instances of the core domain exposing the service for the digital asset, wherein the information indicates one or more digital asset authentication processes used by the one or more network function instances;

sending by the application function instance a request for the determined network function instance of the mobile communication system to provide the service; and sending by the application function instance a message to the user equipment based on a response to the request for the determined network function instance to provide the service.

8. The apparatus according to claim 7, wherein the at least one memory and computer program code are configured to, with the at least one processor, cause the apparatus to: formulate the request for the determined network function instance of the mobile communication system to provide the service, based on information provided by the network repository function instance regarding one or more authentication processes used by the determined network function instance.

9. The apparatus according to claim 7, wherein the service comprises providing an indication of the authentication status recorded by the network function instance for the digital asset.

10. The apparatus according to claim 7, wherein the request by the application function instance to provide the service is sent via a network exposure function of the core domain of the mobile communication system.

11. An apparatus comprising: at least one processor; and at least one memory including computer program code, the at least one memory and computer program code configured to, with the at least one processor, cause the apparatus to perform:

creating, by a network repository function instance, resources profiling services provided by network function instances of a core domain of a mobile communication system, wherein the resources indicate one or more types of user document for which the network function instances provide one or more digital asset authentication services, and one or more digital asset authentication processes used by the network function instances for the one or more digital asset authentication services;

receiving by the network repository function instance a request by an application function instance to provide information regarding one or more network function instances of the core domain exposing the one or more digital asset authentication services, wherein the one or more digital asset authentication services comprise creating a digital representation of at least part of a digital image of a user document, and comparing the digital representation against an authentication reference; and sending by the network repository function instance a response to the request based on the resources.

12. The apparatus according to claim 11, wherein the resources created by the network repository function instance indicate one or more digital asset authentication processes used by the one or more network function instances exposing the one or more digital asset authentication services; and the response for the application function instance indicates the one or more digital asset authentication processes.

13. The apparatus according to claim 1, wherein the at least one memory and computer program code are configured to, with the at least one processor, cause the apparatus to: create a user profile resource for a user based on the message from the management function instance, wherein the user profile indicates a number of documents allowed to be stored for the user, a size of document allowed, a maximum storage size allocated for the user in the network function instance, and whether the digital asset authentication service is enabled for the user.

14. The apparatus according to claim 1, wherein the one or more authentication procedures comprise: (a) invoking an application programming interface for an issuing authority that issued the user document and receiving one of a synchronous authentication response or an asynchronous authentication response based on a subscribe operation by the network function instance indicating a callback uniform resource identifier to be invoked by the issuing authority; (b) verifying a series of digital certificates of a certificate chain for the user document back to a root certificate authority using application programming interfaces to obtain public key certificates according to an ITU X.509 standard format; and (c) scanned physical document verification comprising creating a digital representation of one or more features of an image of the user document comprising at least one of a seal, a logo, an icon, an emoji, or a physical signature and comparing the digital representation with one or more stored or downloaded reference digital representations.

15. The apparatus according to claim 1, wherein the authentication process comprises: sending a request for an intermediate certificate authority to provide information by which the network function instance can verify a first certificate of a certificate chain; based on the information, checking the first certificate in the certificate chain; and sending a request for a root certificate authority to provide information by which the network function instance can verify a certificate of the intermediate certificate authority.

16. The apparatus according to claim 1, wherein the at least one memory and computer program code are configured to, with the at least one processor, cause the apparatus to: extract, by the network function instance, document information from the digital image of the user document using document readers or image processing tools, and initiate the authentication process based on the extracted document information.

17. The apparatus according to claim 7, wherein the determining comprises one or more of: the application function instance using an NFDiscovery application programming interface to discover the network function instance; the application function instance using an HTTP GET operation to fetch document authentication capabilities from a profile registered by the network repository function for the network function instance; or the application function instance using an NFStatusSubscribe request to subscribe to changes in status of the network function instance.

18. The apparatus according to claim 7, wherein the at least one memory and computer program code are configured to, with the at least one processor, cause the apparatus to: formulate, by the application function instance, the request for the determined network function instance to include at least a document type, a document number, an expiry date, an issued date, and an issuing authority for the user document.

19. The apparatus according to claim 11, wherein the resources indicate: (a) one or more application programming interfaces for document authentication at one or more issuing authorities configured for synchronous or asynchronous authentication responses; (b) certificate chain information for verifying a digital certificate of a document signer, or one or more application programming interfaces for downloading certificate chain information for verifying the digital certificate of the document signer; and (c) digital representations of trusted seals, logos, icons, emojis, or physical signatures for scanned physical document verification, or configuration of one or more application programming interfaces for downloading such digital representations.

20. The apparatus according to claim 1, wherein: the request to authenticate the digital asset is received from an application function instance via a network exposure function of the core domain of the mobile communication system, wherein the application function instance is configured to consume one or more services of one or more network functions of the core domain and has determined the network function instance via a network repository function of the core domain based on a profile indicating document authentication capabilities of the network function instance; the network function instance extracts document information from the digital image of the user document; the authentication process comprises invoking, based on the document authentication information, an application programming interface for an issuing authority that issued the user document, and receiving an authentication response from the issuing authority indicating a result of an authentication check; the network function instance stores the digital asset and updates an authentication status for the digital asset based on the authentication response; and the response is sent to the application function instance via the network exposure function indicating the authentication status.

* * * * *